June 21, 1960  E. G. PERRY  2,941,346
METHOD AND APPARATUS FOR THE REMOTE CONTROL OF A LAWN MOWER
Filed Nov. 2, 1953  4 Sheets-Sheet 1
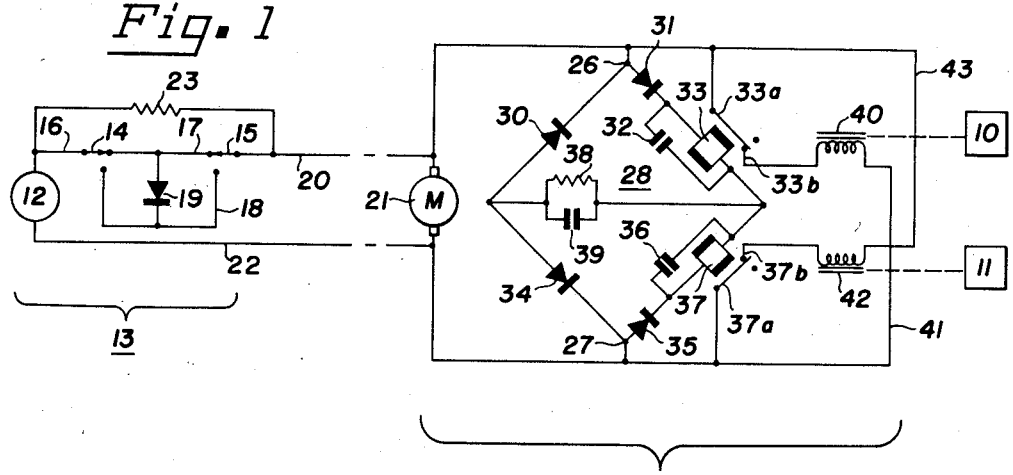
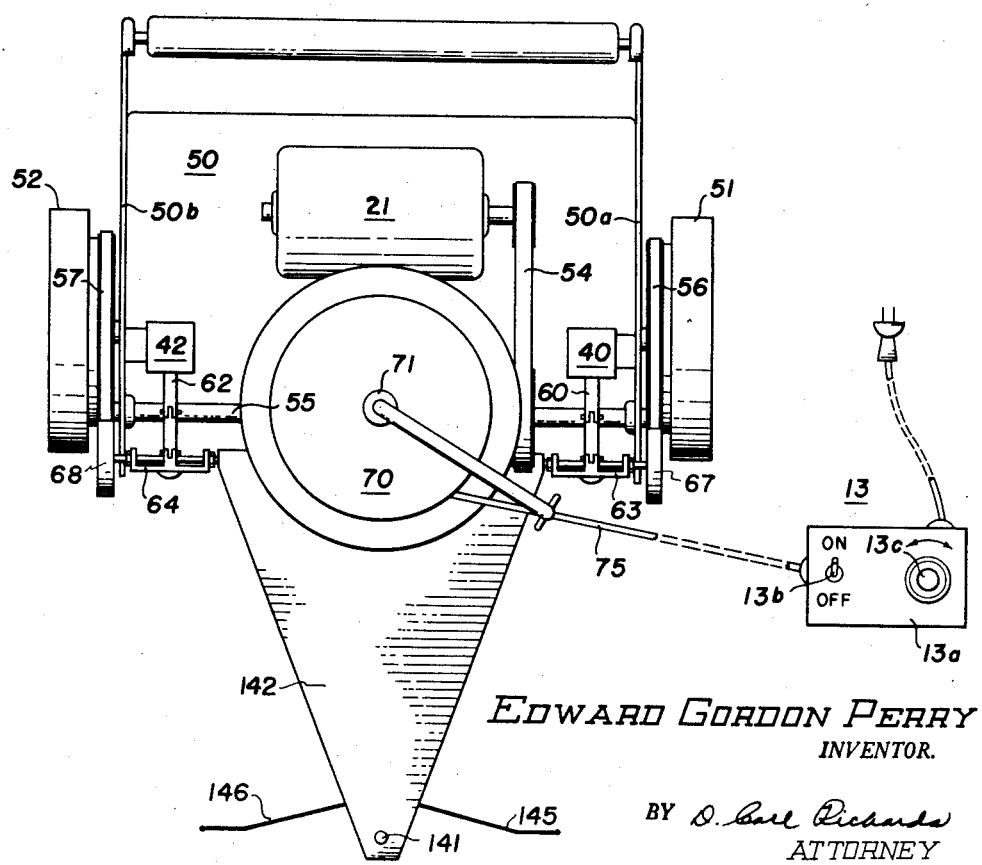
EDWARD GORDON PERRY
INVENTOR.
BY D. Carl Richards
ATTORNEY June 21, 1960 E. G. PERRY 2,941,346
METHOD AND APPARATUS FOR THE REMOTE CONTROL OF A LAWN MOWER
Filed Nov. 2, 1953 4 Sheets-Sheet 2

EDWARD GORDON PERRY
INVENTOR.

BY O. Carl Richards
ATTORNEY

June 21, 1960   E. G. PERRY   2,941,346
METHOD AND APPARATUS FOR THE REMOTE CONTROL OF A LAWN MOWER
Filed Nov. 2, 1953   4 Sheets-Sheet 3

EDWARD GORDON PERRY
INVENTOR.

BY D. Carl Richards
ATTORNEY

June 21, 1960  E. G. PERRY  2,941,346
METHOD AND APPARATUS FOR THE REMOTE CONTROL OF A LAWN MOWER
Filed Nov. 2, 1953  4 Sheets-Sheet 4
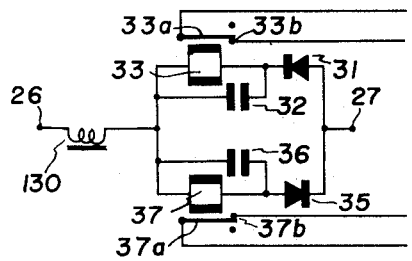
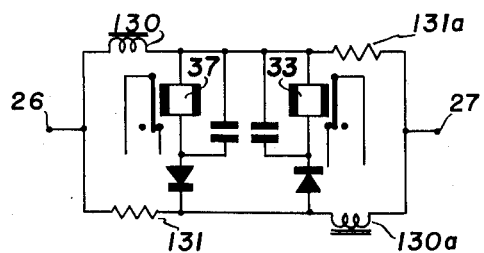
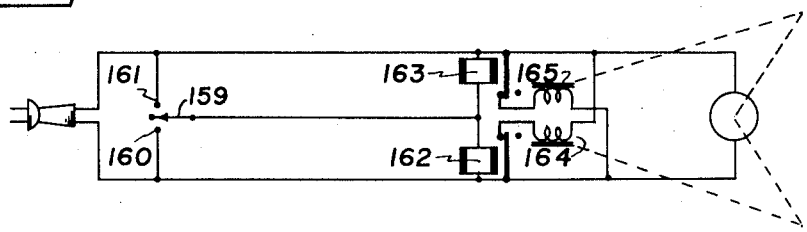
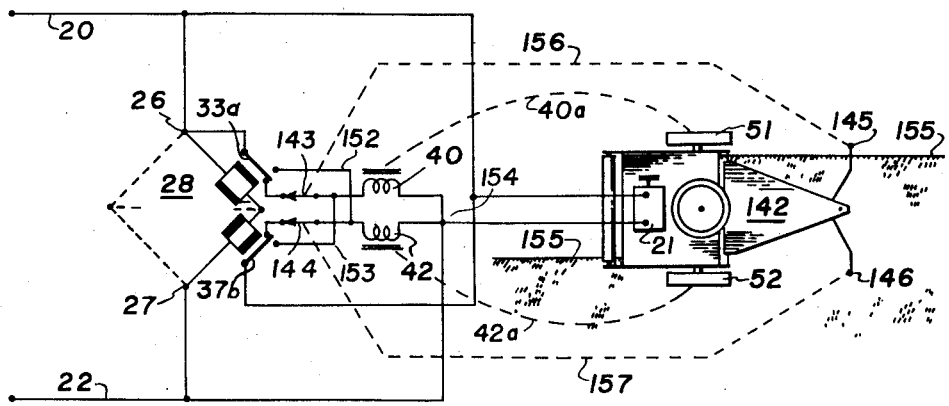
EDWARD GORDON PERRY
INVENTOR.
BY D. Carl Rickards
ATTORNEY United States Patent Office 2,941,346
Patented June 21, 1960

2,941,346

METHOD AND APPARATUS FOR THE REMOTE CONTROL OF A LAWN MOWER

Edward Gordon Perry, 3117 Beverley Drive, Dallas, Tex.

Filed Nov. 2, 1953, Ser. No. 389,592

19 Claims. (Cl. 56—26)

This invention relates to remote control of power utilization as by a transaction system or equivalent, and more particularly to the development of control functions for selectively energizing a sensing system in one of a plurality of distinct modes of operation. In a more specific aspect, the character of electrical energy is selectively modified in either of two senses at a first station and the modified energy is sensed at a second station for control of the utilization of the electrical energy in either of two senses in response to the modification thereof.

Remote control, requiring positive and certain action, in general involves complex instrumentation. Radio frequencies have been employed as well as many other specific systems for and modes of producing a desired control action. However, positive control combined with simplicity in instrumentation is a goal that has not heretofore been readily achieved.

The present invention relates to control of electrical power utilization where control action is produced in response to slight modification of the character of the power voltage at its source and thus does not require complex instrumentation, separate control circuits, or the use of radio or super power frequencies. At the same time, positive control may be maintained while utilizing components readily available at modest cost.

The invention, in a broad aspect, comprises modifying the character of a voltage at or adjacent a power source selectively in either of two senses together with means at a power utilization point responsive to variations in the voltage in a first sense for controlling power utilization in a first mode and responsive to variations in the voltage in a second sense for controlling power utilization in a second mode.

In a more specific aspect there is provided control for a traction device having at least two modes of power utilization which includes the steps of modifying in either of two senses the character of the power voltage delivered to the system and at the traction device selectively sensing variations in one sense and discriminating against variations in the other sense for controlling respectively either of the two modes of utilization.

Further, alternating current normally having axial symmetry at one point in a transmission channel is applied to means for selectively producing dissymmetry in the alternating current of at least two distinct characteristics. Coupled at a remote point to the transmission channel is a circuit having a normal condition and two contrasting conditions of operation which includes means responsive to variations in the character of the alternating current for selectively effecting the normal operating condition or one or the other of the contrasting conditions.

In a still more specific aspect of the invention, direction control is provided for a lawn mower having two separate drives from a single motor which is carried by the mower and energized from a power circuit. Means are provided at one point in the power circuit for altering in either of two senses the symmetry of the alternating current fed to said power circuit. Sensing means carried by the mower are provided for producing two control functions respectively dependent upon variations in symmetry of the alternating current in one or the other of said two senses for selectively altering transfer of mechanical power from the motor to one or the other of the mower drive means.

For a more complete understanding of the invention and for further objects and advantages thereof, reference may now be had to the following description taken in conjunction with the accompanying drawings, in which:

Fig. 1 is a schematic diagram of a control system;

Fig. 2 is a top view of a remote controlled law mower system;

Figs. 11 and 12 are schematic diagrams of control function sensing systems;

Fig. 13 illustrates a lawn mower with direction sensing means; and

Fig. 14 is a further modification of the invention.

Figures 3, 4:
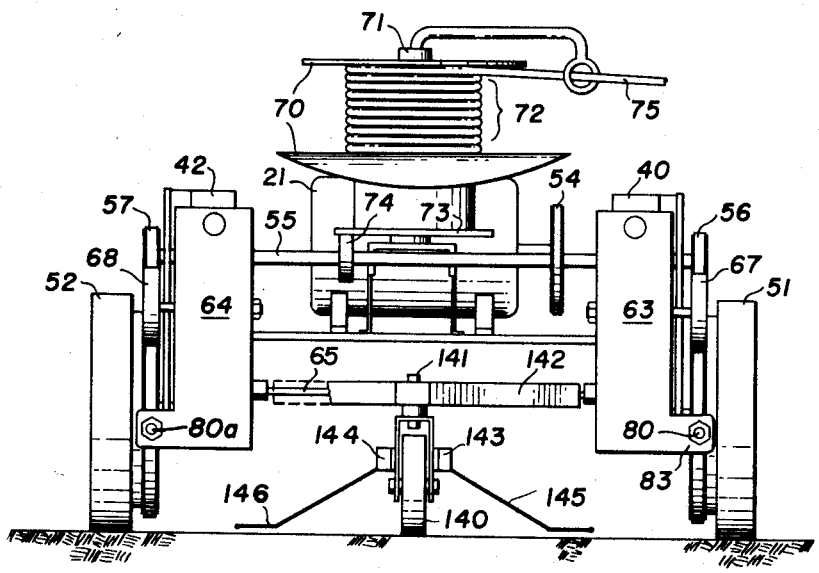
Fig. 3 is a side view partially broken away of the device of Fig. 2.
Fig. 4 is a front view of the device of Fig. 2.

Before turning to a detailed description of the drawings, it should be kept in mind that the invention is particularly adaptable to systems utilizing power from an alternating current source, the control of power use being accomplished by modifying slightly the character of the power energy. While the invention broadly may be applicable to various forms of power utilization and traction devices, for present purposes, the description will pertain to a preferred form of the invention such as an electrically driven lawn mower. From the following detailed description of this specific form, the utility of the present method of remote control in a more general sense will become apparent.

In Fig. 1, there as shown a system suitable for controlling mechanical forces applied to either blocks 10 or 11, developed from power from an alternating current source 12. At a control point or station 13 a network is provided which includes a pair of single pole double throw switches 14 and 15. For convenience, switches 14 and 15 are connected in series in the line conductor 16 leading from one terminal of source 12 but could as well be placed in opposite conductors. One terminal of each of switches 14 and 15 is interconnected by a conductor 17. The second terminals of switches 14 and 15 are interconnected by shunt 18. A rectifier 19 bridges conductor 17 and shunt 18. An output conductor 20 leads from switch 15 to a power utilization device such as motor 21. A second conductor 22 connects the second terminal of source 12 to motor 21. A resistance 23 is connected between conductors 16 and 20 to form a parallel path around switches 14 and 15.

Circuit operation at control station 13 may be understood most readily by considering steady state conditions. When conductor 16 is positive with respect to conductor 22, current tends to flow from conductor 16 through motor 21 to conductor 22. When switch 14 is moved from normal position to its second position the back impedance of rectifier 19 prevents current flow through switch 15, and consequently current must flow through resistor 23. A substantial reduction in voltage is thus produced, the reduction being the IR drop in resister 23. However, when switch 14 is in its normal position and switch 15 is moved from normal position to its second position, current may flow through the path including switch 14, rectifier 19 in the low impedance direction, and switch 15, experiencing no reduction.

An effect opposite that above described is produced when conductor 22 is positive with respect to conductor 16. More specifically, when switch 14 is in its second position, current may flow through rectifier 19, experiencing no reduction. However, when switch 15 is in its second position (with switch 14 in normal position) the current to motor 21 must flow through resistor 23 and is substantially reduced.

From the foregoing, it will now be appreciated that when motor 21 is energized by alternating current from source 12, the positive peaks or the negative peaks of the alternating current voltage are selectively modified or reduced, depending upon the positions of switches 14 and 15. Thus, in Fig. 1 the positive or the negative half-cycle of the voltage from source 12 is selectively reduced in magnitude by operation of switch 14 or switch 15.

The variations in amplitude of positive and negative half-cycles of the power voltage applied to motor 21 are sensed by a bridge network and applied to associated circuits at a utilization point 25. More particularly, the voltage applied to the terminals of motor 21 is also applied to terminals 26 and 27 of the bridge network 28. A first bridge arm adjacent terminal 26 includes rectifier 30. The second arm adjacent terminal 26 includes the rectifier 31 in series with a parallel circuit comprising condensor 32 and the relay coil 33. Similarly, the one arm adjacent terminal 27 includes a rectifier 34 poled opposite rectifier 30. The second arm adjacent terminal 27 includes rectifier 35 poled opposite rectifier 31 and connected in series with the parallel circuit comprising condenser 36 and relay coil 37. The horizontal diagonal of the bridge 28 comprises a parallel RC circuit including resistor 38 and condenser 39.

In operation when conductor 16 is positive with respect to conductor 22, current in bridge 28 must flow from terminal 26 through rectifier 31, parallel circuit 32, 33, RC circuit 38, 39 and rectifier 34 to terminal 27. Conversely, when conductor 22 is positive with respect to conductor 16, current must flow through rectifier 35, parallel circuit 36, 37, RC circuit 38, 39, and rectifier 30 to terminal 26. The rectifiers 30, 31, 34 and 35 are so poled that currents can flow through the RC circuit 38, 39 in but one direction. Therefore, the current flowing through circuits 32, 33 and 36, 37 serve essentially as a power supply source for charging condenser 39 on each half-cycle.

A pair of circuits are connected in parallel with the bridge 28. A first circuit comprises the translating means such as armature 33a of relay 33 having a solenoid coil 40 connected to the "closed" terminal 33b of relay 33. Similarly, armature 37a of relay 37, terminal 37b and solenoid 42 form a circuit in parallel with the bridge 28.

When a half-cycle of voltage across circuit 32—33 is smaller in amplitude than the voltage developed across condenser 39 on a prior half-cycle, a control function reduction in current through relay coil 33, may be made sufficient to release the armature 33a. Similar reduction of an opposite half-cycle will release armature 37a. When circuits through armatures 33a and 37a are closed as shown, the solenoids 40 and 42 are energized by power from source 12, thus applying mechanical forces to the utilization devices 10 and 11. When the circuit through relay armatures 33a or 37a are broken by the selective action of switches 14 or 15, either one of the decoupling means, solenoid 40 or solenoid 41 is de-energized, removing the force applied to either utilization device 10 or 11.

From the foregoing, it will be seen that the control action is produced by selectively altering the magnitude of positive or negative peaks of the power voltage and then sensing such alterations to develop control functions for the selective control of either of two forces. This control action found to be particularly useful is in connection with remote control of a conventional lawn mower. Such a lawn mower system has been shown in some detail in Figs. 2–4. For the purpose of the following description, where appropriate like parts will be given the same reference characters as in Fig. 1.

Referring now to Fig. 2, the lawn mower comprises a carriage 50 mounted on wheels 51 and 52. Motor 21 is supported on carriage 50 and coupled by way of a belt 54 to an idler shaft 55. Shaft 55 in turn is coupled by belts 56 and 57 to drive pulleys fastened to each of wheels 51 and 52. In accordance with the present invention, solenoids 40 and 42 are supported on the carriage 50 from members 50a and 50b and are linked through rods 60 and 62 respectively to rocker arms 63 and 64.

As best seen in Fig. 3, rocker arm 63 is pivoted on a shaft 65 and in turn carries a second shaft 66 approximately midway between shaft 65 and the link 60. An idler pulley 67 is mounted on shaft 66. When solenoid 40 is de-energized, rocker arm 63 falls away from belt 56 and there is slippage between shaft 55 and wheel 51 and consequently little or no tractive power is delivered to the drive pulley fastened to the mower wheel 51. However, when solenoid 40 is energized, idler pulley 67 is forced against belt 56 bringing it into tension and thus producing the application of tractive force through belt 56 to wheel 51. An identical arrangement is provided, as indicated in Figs. 2 and 4, for controlling the application of a tractive force to wheel 52.

In operation switches 14 and 15, Fig. 1, are normally in the positions shown in Fig. 1, and both relays 40 and 42 are energized. Tractive power is thereupon delivered to wheels 51 and 52 and the mower moves straight ahead. If switch 14 is moved from normal to its second position, one wheel, for example wheel 51, will become immobilized but wheel 52 continues to turn so that mower changes course. In the same manner wheel 51 may be controlled by switch 15. Selectability in the position of switches 14 and 15 provides ready control for maneuvering the lawn mower, reducing substantially the physical exertion otherwise historically associated with lawn maintenance.

In Figs. 2–4, it will be noted that a cable reel 70 is provided which as best seen in Fig. 4, is mounted on a vertical shaft 71 suitably supported from a frame 50. The reel includes a spool 72 and a friction take-up plate 73, the latter being positioned under the spool 72 and in frictional engagement with a drive wheel 74 coupled to the idler shaft 55. The frictional coupling between plate 73 and wheel permits unspooling of cable 75 when the mower is moving away from a control station and causes cable 75 to be reeled in as the mower moves toward a control station, thus keeping the mowing site free at all times of the cable and preventing entanglement of the mower in the cable strands. The reel structure includes slip rings and brushes (not shown) for completing the electrical circuit from cable 75 to motor 21 and the associated control components.

In Fig. 2 it will be seen that cable 75 leads from the mower to the control station 13. A control box 13a houses a power switch 13b which serves to open the power circuit to the mower. A control knob 13c is provided to control both switch 14 and switch 15 shown in Fig. 1. Such an arrangement lends more positive control and certainty upon the part of an operator which is requisite in order to admit use of the machine in many locations. Movement of a control element to the right or to the left to produce a left turn or right turn of the controlled system may be confusing, depending upon relative position of the control station and the course of the mower. However, the concept of rotating control element or knob 13c in one sense or direction to produce corresponding rotation of the mower in the same sense or direction is free from confusion. This feature of applicant's invention is material in ultimate use of the device. Control action is such that rotation of control 13c will produce a corresponding "rotation"

of the mower. This is accomplished by arranging the associated circuits such that rotation of the control 13c clockwise stops the right mower wheel, and, when rotated counter-clockwise, stops the left wheel. That is in contrast to systems based upon the concept of turning to the right or to the left. Proper response of the mower to rotation of control element 13c is assured by properly poling rectifiers 19, 30, 31, 34 and 35, and the arrangement of switches 14 and 15 Fig. 1 as above described.

In Fig. 3, it will be seen that the rocker arm 63 pivoted on shaft 65 provides a means for tensioning belt 56 when the relay 40 is energized. The rocker arm 63 also provides a braking member below shaft 65. In the form illustrated, a bolt 80 is secured as by nuts 81 and 82 to an extension 83 of the lower end of the rocker arm 63. Bolt 80 is adjusted in position so that it bears against belt 56 below the pivot point when relay 40 is de-energized, thus causing an immediate braking action on wheel 51. The side of the mower thus affected is brought to an abrupt halt, making more positive the control of the mower. In Fig. 4 it will be seen that both rocked arms 63 and 64 are provided with such braking arrangements. The idler pulleys 67 and 68 are supported as to register with associated belts 56 and 57 above the pivot shaft 65 and the braking members 80 and 80a similarly supported for registration with the faces of belts 56 and 57 respectively below the pivot point.

In Figs. 1–4, the application of mechanical forces to the drive wheels 51 and 52 is shown as controlled by the solenoids 40 and 42. Such action is preferred because maximum force is applied to the pulleys 67 and 68 when the armatures of solenoids 40 and 42 are near the maximum traverse or throw. However pulleys 67 and 68 may be forced against belts 56 and 57 by springs. The solenoids 40 and 42 may then be utilized to retract pulleys 56 or 57 upon selective operation of switches 14 and 15, and in that manner to control and selectively change the course of the mower.

Turning now to Figs. 5–10, different forms of circuits for modifying the character of the power voltage or the electrical energy in a manner suitable for detection at the utilization point are shown. In each case power is applied to terminals 90 for transmission to terminals 90a.

Figure 5:
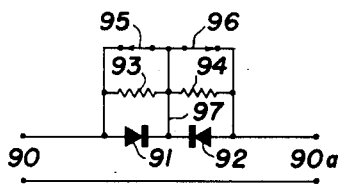
Figs. 5–10 are modifications of the portion of Fig. 1 which produces control functions.

In Fig. 5, the circuit controls the magnitude of positive or negative peaks of the alternating current voltage transmitted from input terminals 90 to output terminal 90a. The circuit comprises a pair of rectifiers 91 and 92 connected in series and poled opposite one another. In parallel with rectifiers 91 and 92 are a pair of resistors 93 and 94 forming a first circuit and a pair of switches 95 and 96 forming a second circuit. The points intermediate rectifiers 91 and 92, resistors 93 and 94, and switches 95 and 96, are electrically common, being interconnected by conductor 97. When switch 95 is open, voltage peaks of one polarity are reduced in magnitude, whereas voltage peaks of the opposite polarity are unchanged. Conversely, when switch 96 is open, voltage peaks of the second polarity are substantially reduced while voltage peaks of the first polarity are unchanged. Such action is caused by the selective routing of currents through rectifiers 91 and 92 and resistors 93 and 94.

Figure 6:
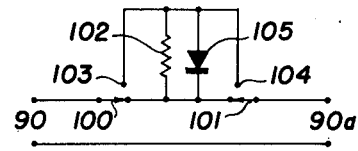

In Fig. 6 half of the resistances and rectifiers of Fig. 5 have been eliminated while retaining the circuit action. In this circuit, switches 100 and 101 are connected in series with one line conductor. The point intermediate switches 100 and 101 is connected by way of resistor 102 to each of terminals 103 and 104. Resistor 102 is shunted by rectifier 105. When switch 100 is connected to terminal 103, voltage of one polarity is reduced and voltages of the opposite polarity are unchanged. The reverse action takes place when switch 101 is connected to terminal 104.

Figure 7:
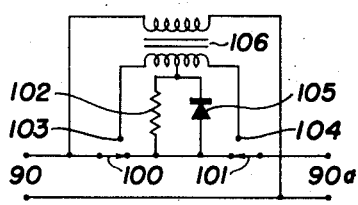

In Fig. 7, where like parts have been given the same reference characters as in Fig. 6, it will be seen that the circuit is similar to that of Fig. 6 but that a transformer 106 has been added. The primary winding is connected directly across the input terminals 90. The secondary winding is connected between terminals 103 and 104 so that there is effectively produced an increase in voltage peaks of one polarity when switch 100 is connected to terminal 103 (or switch 101 to terminal 104) rather than a decrease as in Fig. 6.

Figure 8:
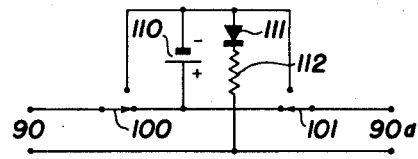

In Fig. 8 the circuit is similar to that of Fig. 6. Switches 100 and 101 are in series with one line conductor, however the resistor 102 and rectifier 105 of Fig. 6 have been replaced, in Fig. 8, by a battery 110. The action with battery 110 in circuit in some respects is similar to that described in Fig. 6. Here, a unidirectional component is introduced by battery 110 as distinguished from a mere reduction in the amplitude of alternating half-cycles of the alternating current voltage. Further, in Fig. 8 a rectifier 111 and a resistor 112 connected in series with battery 110 and across the line provides a trickle charge to maintain battery 110 in proper condition.

Figure 9:
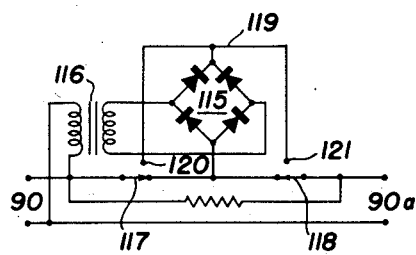

In Fig. 9, the circuit is similar to that shown in Fig. 1, with the rectifier 19 of Fig. 1 replaced by a full wave rectifying bridge network 115 for generating a unidirectional component for addition to the voltage applied to the input terminals 90. More particularly, the transformer 116 has its primary winding connected across input terminals 90 and its secondary winding connected to the horizontal diagonal of bridge network 115. The vertical diagonal of the bridge is connected at the lower end to a point intermediate switches 117 and 118. The conductor 119 in turn is common to the auxiliary terminals 120 and 121. The bridge network 115 thus produces a unidirectional voltage whose function is similar to that introduced from battery 110 on Fig. 8.

Figure 10:
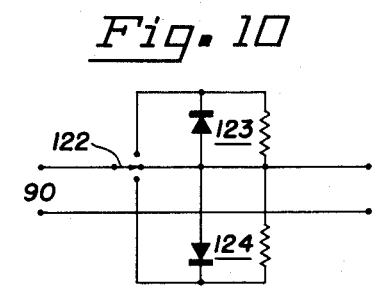

In Fig. 10 a single pole 3-position switch 122 has been provided together with a pair of rectifier resistor circuits 123 and 124. Circuit action here is such as to reduce the amplitude of positive or negative half-cycles of alternating voltage applied to terminals 90 in dependence upon the position of the single switch 122.

The foregoing illustrates variations in components and circuit operations suitable for producing modifications in the voltage applied to a sensing network.

While the circuit shown in Fig. 1 for differentiating between variations of character of the power voltage is preferred, the sensing networks of Figs. 11 and 12 are also suitable. The networks may be connected to terminals 26 and 27 of Fig. 1 in place of bridge 28. Where appropriate like parts have been given the same reference characters as in Fig. 1.

In Fig. 11 inductance 130 substantially limits current flowing through coils 33 and 37 to unidirectional components of combined D.C. and A.C. currents at terminals 26 and 27. Rectifier 31 permits current of but one polarity to flow in coil 33 to actuate relay armature 33a. Rectifier 35, poled opposite rectifier 31, permits current only of the opposite polarity to flow through relay coil 37 to actuate armature 37a. While inductance 130 may cause the circuit to be unusually selective if it is of the saturable core type, satisfactory action is obtained with a non-saturable inductance.

In Fig. 12 a second inductance 130a has been added along with a pair of resistances 131 and 131a. Here the combined action of inductances 130, 130a and resistances 131, 131a is to more completely discriminate against A.C. components of current appearing at terminals 26 and 27 and to selectively route D.C. components through relays 33 and 37. It will be apparent that still further discrimination may be effected by substituting capacitors for resistors 131, 131a. In this respect it will be seen that in Fig. 1, rectifiers 30 and 34 may be replaced by resistors. This effectively will reduce actual power available in the RC circuit 38, 39 by one-half, all other conditions remaining unchanged. In such event, the relays 33 and 37 may be adjusted as to operate at the new level.

From the foregoing it will be seen that positive control of a traction system such as the lawn mower of Figs. 2–4 may be accomplished through use of non-complex instrumentation and through use of the actual power voltage and power circuit between the source and the mower. Mere rotation of control knob 13c will cause corresponding "rotation" of the mower.

Provision has been made in Figs. 2–4 for control not only by manual operation at control station 13 but also through an automatic grass hunting system. More particularly, a wheel 140 is mounted as to pivot on shaft 141. Shaft 141 is suitably journaled in a frame element 142 which in turn is supported from the mower by shaft 65. A pair of fairly sensitive switches 143 and 144 are mounted for movement with wheel 140. Feeler arms 145 and 146 are supported by and extend downwardly and forward from switches 143 and 144 respectively. Arms 145 and 146 are designed to actuate switches 143 and 144 when either arm comes in contact with or moves out of contact with grass. Operation in accordance with this aspect of the invention is such that, by remote control as from station 13, the mower may be guided around the periphery of an area to be mowed, cutting a first swath. If the mower is traveling in a clockwise direction around the area, the circuit controlled by arm 145 will be so arranged as to release tractive power from wheel 51 when arm 145 enters uncut grass. The circuit controlled by arm 146 will be so arranged as to maintain application of tractive power on wheel 52 so long as arm 146 is in uncut grass. The mower will thus guide itself around a given plot, reducing the plot dimensions on each trip by a newly cut swath. When the entire area has been cut the mower will merely propel itself in a tight circle and may at that time, by remote control, be guided to new areas.

A circuit arrangement for accomplishing the foregoing action is shown in Fig. 13. Where consistent, like parts have been given the same reference characters as in Figs. 1–4. Conductors 20 and 22 are connected directly to motor 21. Links 40a and 42a, shown as dotted lines, diagrammatically represent control of tractive forces on either side of the lawn mower upon selective de-energizing of solenoids 40 and 42.

Automatic control is provided by connecting switch 143 in series with the armature 33a and solenoid 40. Switch 143 is controlled through mechanical linkage 156 by feeler arm 145 and is so connected as to be normally closed (as shown) and will be opened when the end of feeler arm 145 moves into uncut grass. Similarly, a second switch 144, in series with armature 37b and solenoid 42, is controlled through mechanical linkage 157 by feeler arm 146. Switch 144 is so arranged as to normally be open and is closed by feeler arm 146 when the end thereof is in uncut grass. Conductors 152 and 153 are cross connected around switches 143 and 144 to permit control of the mower from the remote station 13 (Fig. 1) regardless of the relationship of the mower to the margin 155 or uncut grass area.

Referring now to Fig. 14, a three-wire control system is illustrated in which closure of switch 159 to terminal 160 or to terminal 161 will cause relay 162 or relay 163 to be de-energized, opening the power circuit to traction controlling solenoid 164 or solenoid 165. Thus, by means of a third wire, positive direction control may be maintained.

It will now be appreciated that a preferred form of the invention is embodied in Figs. 1–4 but that various modifications may be made without departing from the spirit and scope of the invention. By way of illustration only, and not by way of limitation, the following specifications are descriptive of a system found to be satisfactory for control of a lawn mower powered by a ⅓ H.P. single phase motor operating on 110 volts:

| | |
|---|---|
| Resistor 23 | 6 to 15 ohms, 25 watts. |
| Rectifier 19 | 3.2 amp., 26 volt, selenium. |
| Rectifiers 30, 31, 34, 35 | 100 millamp, 150 volt. |
| Condenser 39 | 160 microfarads, 150 volt. |
| Resistor 38 | 3000 ohms, 20 watt. |
| Condensers 32, 36 | 40 microfarads, 150 volt. |
| Solenoids 40, 42 | Bendix 110 volt A.C. solenoid. |

It will now be apparent that clutches may be substituted for the belt drive to the power wheels, and selectively controlled by sensing systems as shown. Further, while reference has been made to controlling tractive power applied to the sides of a mower or to the mower wheels, it will be understood that the course of the mower may be determined by controlling a third wheel, such as the wheel 140, Figs. 2–4, where the sensings system herein described control the orientation of said third wheel. These and other modifications may now suggest themselves to one skilled in the art and it is intended to cover such modifications as fall within the scope of the appended claims.

What is claimed is:

1. The method of controlling utilization of power from an alternating current source which comprises modifying the character of the alternating current in one or the other of two selectable senses at a control point, at a utilization point remote from said control point selectively detecting said modification to produce one or the other of two control functions of distinctively contrasting character in dependence upon the sense of said modifications, concurrently producing a sustained mechanical force from said alternating current, and selectively transmitting said force for utilization in dependence upon said control functions.

2. The method of controlling through a bridge network utilization of power from an alternating current source which comprises modifying the character of the alternating current in one or the other of two selectable senses at a control point, at a utilization point remote from said control point applying said modified alternating current to said bridge network, upon flow of said alternating current in said bridge network producing in one of two bridge arms one of two distinctive control functions in dependence upon the sense of the modification of said alternating current, concurrently developing a sustained mechanical force from said alternating current, and selectively transmitting said force for utilization in dependence upon said control functions.

3. The method of remote control of a lawn mower supplied with tractive and cutting power from an alternating current power circuit which comprises selectivity modifying the character of said alternating current in one or the other of two selectable senses at a point in said circuit remote from said lawn mower, at said lawn mower detecting the modification of said alternating current to produce one or the other of two control functions in dependence upon the sense of said modification, and selectively controlling the transmission of tractive power to one side or the other of said mower in dependence upon said control functions while maintaining continuous application of said cutting power.

4. The method of remote control of a lawn mower supplied with tractive and cutting power from an alternating current power circuit terminated in a motor and a bridge network which comprises selectivity modifying the character of said alternating current in one or the other of two selectable senses at a point in said circuit remote from said lawn mower, selectively sensing the modification of said alternating current in said bridge network to produce in one of two adjacent arms a control function dependent upon the sense of said modification, and selectively controlling the transmission of tractive power from said motor to one side or the other of said mower in dependence upon said control function while maintaining continuous application of said cutting power.

5. The method of remote control of a lawn mower supplied with tractive and cutting power from an alternating current circuit terminated in a motor which comprises selectively varying the magnitude of current peaks of a first polarity or current peaks of a second polarity at a control point remote from said lawn mower, producing a first control function at said lawn mower in dependence upon variation in peaks of said first polarity and a second control function in dependence upon variations in peaks of said second polarity and separately controlling transmission of tractive power from said motor to one side of said mower in dependence upon said first control function and to the other side of said mower in dependence upon said second control function while maintaining continuous application of said cutting power.

6. The method of claim 5 in which a counter clockwise rotational motion is utilized to modify said peaks of first polarity and said first control function controls tractive power transmission to the left side of said mower and in which a clockwise rotational motion is utilized to modify peaks of said second polarity and said second control function controls tractive power transmission to the right side of said mower.

7. In a power lawn mower adapted to provide tractive power for laterally spaced wheels the combination comprising separate driving connections to said wheels, a circuit of two conductors extending from each of said driving connections exclusively responsive to different signals, means at said control point for selectively introducing at least two signals into said circiut, and translating means in said circuit adjacent to each of said driving connections exclusively responsive to different signals in said circuit and adapted selectively to alter said driving connections.

8. In a lawn mower having separate power transfer means for each of two drive wheels the combination comprising, an electrical circuit of two conductor extending from a remote point to said mower, normally energized solenoids for each of said power transfer means adapted normally to maintain application of tractive power to said wheels, a control circuit at said remote point for applying to said circuit electrical signals selectively of one of two distinct characteristics, and a means coupled to said circuit and to both said solenoids and responsive to said electrical signals for selectively deenergizing said solenoids to remove tractive power from their associated wheels thereby to alter the course of said mower.

9. A power and traction control system comprising an electrical power circuit, means at one end of said circuit for translating the electrical power in said circuit into tractive mechanical forces, means at the other end of said circuit for selectively introducing therein an electrical component having one of two distinctive characteristics, and means at said one end adapted individually to control said tractive forces at one or the other side of said system in response respectively to said component of one or the other of said characteristics.

10. In combinnation with a lawn mower having separate belts for driving each of two power wheels from an electrical motor, a course control system which comprises means remote from said mower for selectively producing variations in either of two senses and in selectable magnitude the character of the electrical energy fed to said motor, means on said mower responsive to said variations in a first sense for altering the power transfer to one of said wheels and responsive to said variations in a second sense for varying the power transfer to the second of said wheels.

11. A remote control system for a lawn mower having separate belt means for applying power from a motor to each of two drive wheels which comprise a power circuit for applying electrical energy to said motor, a control element remote from said mower, a circuit intermediate said control element and said power circuit and responsive to said control element for selectively producing variations in either of two senses the character of the electrical energy fed to said motor, a first means on said mower connected to said power circuit and responsive to said variations in a first sense for varying the power transfer through said belt means to one of said wheels, and means on said mower responsive to said variations in a second sense for varying the power transfer through said belt means to the second of said wheels.

12. In a system utilizing electrical energy from a two conductor alternating current circuit and capable of at least two modes of power utilization, the combination which comprises means remote from the point of power utilization for selectively producing variations in either of two senses the character of the electrical energy fed to said utilization point, means connected to said circuit adjacent said point of utilization and responsive to variations in a first sense for controlling power utilization in one of said modes and means connected to said source adjacent said point of utilization and responsive to variations in a second sense for controlling power utilization in a second of said modes.

13. The combination set forth in claim 12 wherein means are provided for selectively altering the magnitude of the positive peaks or the negative peaks of the said alternating current and wherein the means at said point of utilization comprise solenoid means selectively operable in dependence upon voltage levels in the range of control of the varying means.

14. The combination set forth in claim 12 in which means are provided for introducing into said two wire system unidirectional components of electrical energy of positive or negative polarity and wherein said means at said utilization point are responsive to the presence or absence of said components of one polarity or the other to control.

15. A course control system in combination with a lawn mower propelled by energy from a power circuit exciting an electrical motor comprising separate driving connections for applying tractive power from said motor to each side of said mower, means in said power circuit remote from said lawn mower for selectively producing slight modification of the character of said energy in either of two senses, a clutch means for controlling each of said driving connections, and circuit means responsive to said modifications in one of said senses for controlling one of said clutches and in the other of said senses for controlling the other of said clutches.

16. A remote controlled lawn mower system supplied with tractive and cutting power from an alternating current circuit terminated in a motor which comprises a pair of transfer links between said motor and the right and left sides of said mower, a bridge network connected across said circuit, control means for each of said links coupled to said bridge and energized from said circuit normally to effect transmission of tractive power to both sides of said mower, means at a point in said circuit remote from said mower for producing selective modification of said alternating current in one or the other of said two senses, and sensing means in said bridge network responsive to the modifications for selectively deenergizing one or the other of said control means.

17. A remote controlled lawn mower system supplied with tractive and cutting power from an alternating current circuit terminated in a motor which comprises a pair of tractive power transfer links between said motor and the sides of said mower each including clutch means, a bridge network connected across said circuit, control means for each of said clutch means coupled to said bridge network and excited from said circuit normally to maintain transmission of tractive power to both sides of said mower, means in said circuit at a point remote from said lawn mower for producing selective modifications of said alternating current in one or the other of two senses, and sensing means in said bridge network responsive to said modifications for selectively deenergizing said control means to release one or the other of said clutch means.

18. A remote controlled lawn mower system supplied with tractive and cutting power from an alternating current circuit terminated in a motor which comprises a pair of tractive power transfer links between said motor and the sides of said mower each including a releasable belt drive, a sensing network connected across said circuit, tensioning means for each of said belt drives, control means for each of said tensioning means coupled to said sensing network and excited from said circuit normally to tension said belts for transmission of said tractive power to both sides of said mower, means in said circuit at a point remote from said lawn mower for producing selective modification of said alternating current in one or the other of two senses, and means in said sensing network responsive to said modification for selectively actuating said control means to release tension on one or the other of said drives.

19. The method of remote control of a lawn mower supplied with tractive power from an alternating current power circuit which comprises selectively producing at a point remote from said lawn mower a modification of the character of electrical energy in said power circuit of a first sense upon a rotational motion in clockwise direction and of a second sense upon a rotational motion in a counterclockwise direction, at said mower sensing said modification of said first sense to produce clockwise rotational motion of said mower, and sensing said modification of said second sense to produce counterclockwise rotational motion of said mower.

References Cited in the file of this patent

UNITED STATES PATENTS

| | | |
|---|---|---|
| 694,791 | Sack | Mar. 4, 1902 |
| 1,170,877 | Colwell et al. | Feb. 8, 1916 |
| 1,461,323 | Peters | July 10, 1923 |
| 1,627,252 | Peters | May 3, 1927 |
| 1,764,851 | Palm | June 17, 1930 |
| 1,778,465 | Ozanne | Oct. 14, 1930 |
| 1,779,583 | Blydenburgh | Oct. 28, 1930 |
| 1,794,446 | Davis | Mar. 3, 1931 |
| 2,133,512 | Herge | Oct. 18, 1938 |
| 2,155,343 | Bonanno | Apr. 18, 1939 |
| 2,213,384 | Conwell et al. | Sept. 3, 1940 |
| 2,266,851 | Conwell et al. | Dec. 23, 1941 |
| 2,331,144 | Sitter | Oct. 5, 1943 |
| 2,494,873 | Hall | Jan. 17, 1950 |
| 2,513,868 | Hill | July 4, 1950 |
| 2,521,262 | Smith | Sept. 5, 1950 |
| 2,566,512 | Bilderbeck | Sept. 4, 1951 |
| 2,581,119 | Matteoli | Jan. 1, 1952 |
| 2,690,043 | Marihart | Sept. 28, 1954 |
| 2,698,507 | Siebring | Jan. 4, 1955 |
| 2,708,977 | Scheppe | May 24, 1955 |